Aug. 28, 1956  C. LAVAL, JR  2,760,417
SUBMERSIBLE PHOTOGRAPHIC APPARATUS
Filed Jan. 21, 1953
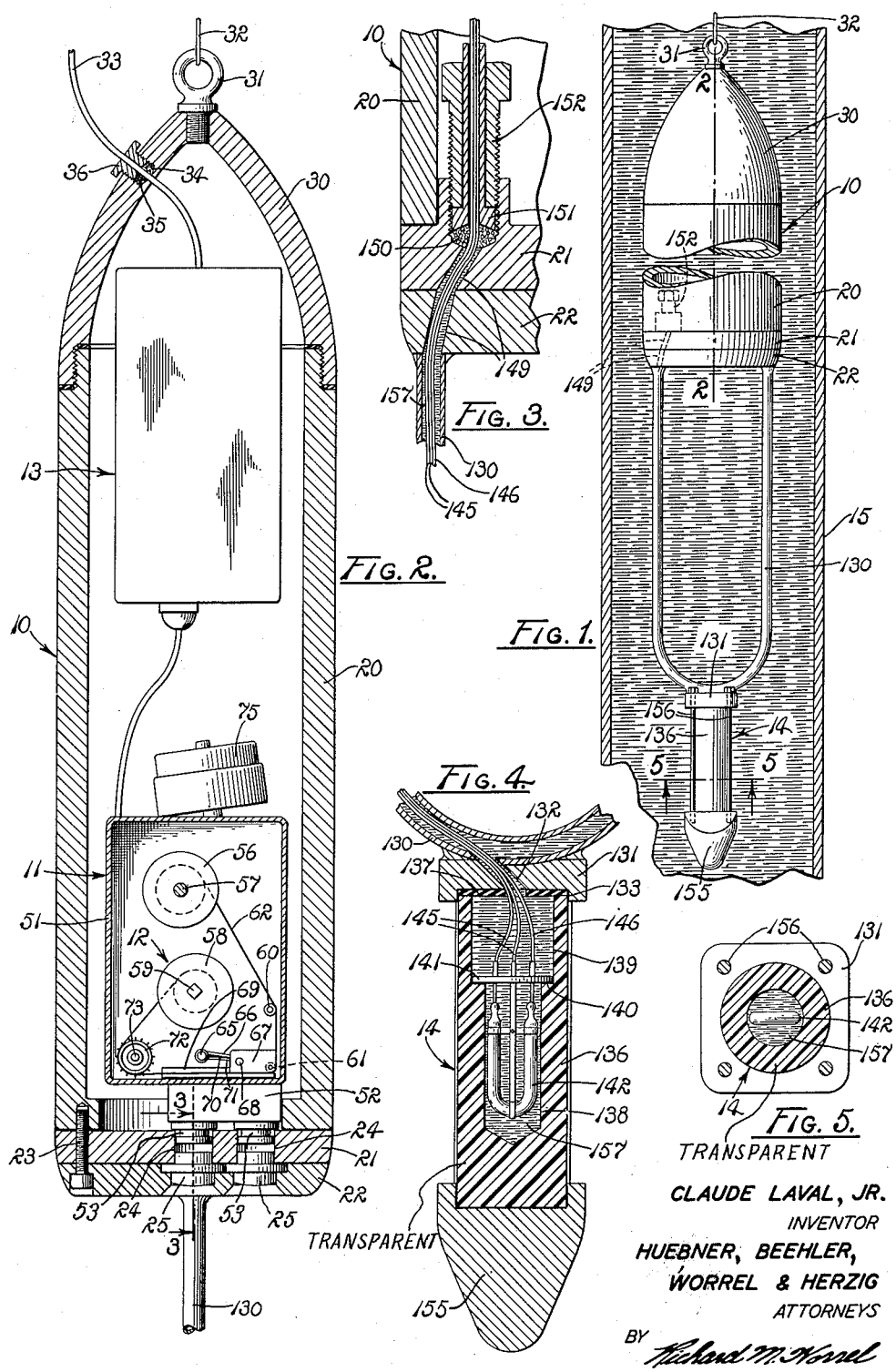
CLAUDE LAVAL, JR.
INVENTOR
HUEBNER, BEEHLER,
WORREL & HERZIG
ATTORNEYS
BY

United States Patent Office 2,760,417
Patented Aug. 28, 1956

2,760,417

SUBMERSIBLE PHOTOGRAPHIC APPARATUS

Claude Laval, Jr., Fresno, Calif.

Application January 21, 1953, Serial No. 332,251

9 Claims. (Cl. 95—11)

The present invention relates to submersible photographic apparatus and more particularly to such an apparatus having improved means for illuminating submerged target areas for photographic purposes.

The broad essence of the instant invention was disclosed in my copending patent application Serial Number 144,012 filed February 13, 1950, entitled "Apparatus Adapted to Provide Photographic Records of Wells and The Like," now U. S. Patent 2,633,783, of which this application constitutes a continuation-in-part.

The problems encountered in the photographing of wells and boreholes were referred to generally in the above identified patent application. Satisfactory illumination has been one of the most difficult objectives to attain particularly in photographing objects immersed in liquids which diffuse, disperse, or reflect light. Inasmuch as the water in wells, rivers, harbors and the like contains considerable foreign matter, most under water photography has encountered serious illumination problems. Frequently, the more urgent the need for photographic records, the more turbid is the fluid in which the photographs must be taken. Well water and other fluids containing impurities frequently must be flocculated to agglomerate the impurities before effective light transmission therethrough is possible. The agglomerated particles are prone to remain in suspension for protracted periods and cause great difficulty in obtaining photographic records because of their light reflecting properties. Further, it has been regarded as virtually impossible to photograph below the surfaces of even relatively light oil and other liquids which appear opaque when illuminated from in the direction of visual or photographic inspection.

Conventional submersible cameras have employed light sources adjacent to the cameras which project light in the direction their respective cameras are aimed. Such cameras as that shown in the United States Patent No. 818,489 to Trapp; No. 1,331,627 to Dilts; No. 1,658,537 to Reinhold; No. 2,161,380 to Opocenski; No. 2,203,176 also to Opocenski and No. 2,341,745 to Silverman et al., are of this type. When such illumination is practiced in light diffusing, dispersing, reflecting or semi-opaque liquids, satisfactory photographic results are impossible. Even though such liquids are flocculated, the reflection from the resultant floc precludes successful photography. The broad essence of the instant invention resides in the discovery that by the proper positioning of a light source with reference to a submersible camera, whether of the light sensitive chemical or electronic type, excellent photographic results can be obtained in light diffusing, dispersing and reflecting liquids and even in liquids which heretofore have been regarded as opaque.

An object of the present invention is to facilitate the photographing of wells, well casings, boreholes, and the like below the surface of liquids contained therein.

Another object is to provide an improved photographic apparatus suitable to operation immersed in clear, translucent, and other liquids heretofore considered to preclude satisfactory photographic operations.

Another object is to provide photographic records of photographic targets generally, immersed in fluids, such as well casings, lost well equipment, sunken ships, ocean floor formations, submerged cables, walls and bottoms of fluid containers, fluid pipe lines, and the like.

Another object is to provide a photographic apparatus having electrical means for advancing strip film therethrough in a predetermined increment of travel each time the means is energized, an electrical system for the film advancing means including means for storing electrical energy within the apparatus, a light source for exposing film in the photographic apparatus disposed in alignment and spaced relation with the photographic apparatus, and means responsive to the interruption of electrical supply to the apparatus energizing the light source from electrical energy accumulated in the storing means.

Further objects are to provide improved elements and arrangements thereof in a device of the character and for the purposes set forth.

Still further objects and advantages will become apparent in the subsequent description in the specification.

Referring to the drawings:

Fig. 1 is a fragmentary longitudinal section of a well showing a photographic apparatus embodying the principles of the present invention suspended in the well, the photographic apparatus being foreshortened, by removal of a central portion thereof, for illustrative convenience.

Fig. 2 is a somewhat enlarged longitudinal section of the photographic apparatus taken on line 2—2 of Fig. 1.

Fig. 3 is a further enlarged fragmentary section taken on line 3—3 of Fig. 2.

Fig. 4 is a fragmentary section through a light source embodied in the form of the invention shown in Fig. 1.

Fig. 5 is a section taken on line 5—5 of Fig. 1.

Referring in greater detail to the drawings:

The illustrated apparatus will be seen to include a housing 10, a camera assembly 11, a film advancing mechanism 12, a power pack 13, and a light source 14. The numerals indicate general elements and assemblies subsequently described in detail. The housing 10 is fluid-tight and contains the camera 11 which is preferably of a constant-exposure strip-film type. The film-advancing mechanism 12 and the power pack 13 are jointly intermittently energized from a source of electrical energy, not shown, exteriorly of the housing. Provision is made for the advancement of film a predetermined increment of travel through the camera by the mechanism 12 each time the mechanism is energized whereupon the mechanism is stopped until electrical connection between the apparatus and the source of electrical energy is interrupted and subsequently reestablished. When electrical connection with the source of electrical energy is interrupted the power pack 13 is, automatically in response thereto, connected to the lamp for discharge therethrough. Re-establishment of connection of the apparatus to the source of electrical energy, again starts the film travel through the camera, disconnects the power pack from the source of illumination and reconnects the same to the source of electrical energy for recharging. As shown in Figure 5, the apparatus makes a compact unit which may be lowered into a well 15, or the like and which, as will soon become apparent, operates dependably in either immersed or emersed condition.

Housing

The body of the housing 10 is preferably a hollow cylindrical pipe-like portion 20 having a transversely flush head end and an opposite male screw-threaded end. A circular inner head plate 21 is fitted on the head end of the portion 20 in fluid-tight engagement. Sealing gaskets, not shown, may be employed between the portion 20 and inner head plate 21, if desired. A circular outer head plate 22 overlays the head plate 21 and the peripheries of the two plates endwardly rounded to provide a generally streamlined effect. The plates are held in position by socket-headed cap screws 23 extended therethrough and engaged in the body portion 20. A pair of spaced bores 24 are formed axially through the plates 21 and 22 and have windows 25 mounted therein.

As shown in Figure 2, the windows conveniently provide cylindrical portions fitted to the portions of the bore in each of the plates and a circumscribing flange which is held between the plates in a counter-bore in fluid-tight engagement. Each of the windows has transversely slanted endwardly disposed surfaces so that as the apparatus is moved endwardly through fluid, the fluid in which it is immersed impinges on the windows and tends to flush dirt therefrom.

A streamlined generally paraboloidal upper end 30 is screw-threadably mounted on the upper end of the portion 20 in fluid-tight engagement therewith. A supporting eyelet 31 is mounted axially in the end 30 and provides dependent support on a cable 32, or other suitable supporting device, connected thereto. An electric supply cable 33 furnishes electrical energy to the camera assembly 11, film-advancing mechanism 12, power pack 13, and indirectly to the light source 14. For passage of the cable through the end 30, an aperture 34 is formed therein through which the cable extends. Fluid-tight integrity is assured by providing the aperture with an outer counter-bore receiving packing 35 tightened into place by a packing bushing 36 screw-threadably mounted in the counter-bore.

The camera assembly 11 is mounted in the housing 10 in any suitable manner and preferably protected by a case 51. A lens holder 52 is provided on the case 51 in alignment with the bores 24 and serves to mount lenses 53 in alignment with the bores. The lenses have focal points within the housing 10 preferably just inside the case 51. The lenses also have an object focal plane or zone in externally spaced relation to the housing.

A film supply reel 56 is rotatably mounted in the case 51 as at 57. The reel and mounting preferably provide a slight braking action, or frictional resistance, to rotation of the reel to avoid excessive unwinding during operation of the apparatus. A winding reel 58 is rotatably mounted in the case as on a rotatable shaft 59. Guide spools 60 and 61 assist in the well known manner in directing film, represented at 62, from the supply reel to the winding reel by way of the focal points of the lenses.

In order dependably to maintain the film at the focal points of the lenses, a pin 65 is fixedly mounted in the case 51. An arm 66 is radially extended from the pin for pivotal movement thereabout. A pair of guides 67 are pivotally mounted on the extended end of the arm 66, as on a pin 68. The guides 67 are interconnected by a slide plate 69 adapted to overlay the film as it is traveled past the lenses. The slide plate 69 is opaque and blocks admission of light to the case 51 through the film. A leaf spring 70 is fastened to the arm 66, as at 71, and operates against a flat provided on the pin 65 so as to urge pivotal movement of the arm 66 toward the frame. A sprocket 72 is mounted on an axle 73 journaled in the case 51 in a position to draw the film 62 past the lenses 53 by engagement of teeth of the sprocket with the well known driving perforations in the film.

The film-advancing mechanism 12 employs a motor 75 conveniently mounted on the case 51. The motor has any desired driving connection, not shown, with the winding reel 58 and the sprocket 72. Upon motor actuation, the film is drawn from the supply reel 56 past the guide spools 60 and 61, between the guides 67, and under the plate 69. The film meshes with teeth on the sprockets 72 in the well known manner and is taken up on the rotated winding reel 58. It will be noted that the camera is of the constant exposure or shutterless type and receives illumination when the film is stationary for exposure thereof.

Power pack

Suffice it to observe that the power pack 13 is mounted in the housing 10 and energized by electrical connection to the cable 33 which in turn is successively connected to, and disconnected from, a source of electrical energy at the top of the well or other position remote from the device for purposes soon to become apparent. The pack utilizes an electrical circuit including means, not shown, for accumulating electrical energy from the cable 33 concurrently with energization of the motor 75 to advance strip film a predetermined distance of stepped progression when the cable is connected to a source of electrical energy, and discharges the accumulated electrical energy through the light source 14, to energize the same, when the cable is disconnected from the source of electrical energy. The power pack and circuit are described in greater particularity in the above identified copending application but inasmuch as they simply illustrate suitable operating means and do not limit the invention comprising the subject matter of this patent application, they are not shown nor described in greater detail herein.

Illumination

Attention is now invited to the structure making possible the significant illumination advantages of the present invention. A substantially U-shaped conduit 130 is weldably, or otherwise secured, to the outer head plate 22 and endwardly extended from the housing 10. Although a conduit of general U-shape is preferred for purposes of strength and because of its non-snagging characteristics, conduits of other form may be utilized, such as that shown at 130 in the copending application of reference.

A base plate 131 is weldably or otherwise mounted on the extended end of the conduit conveniently tangentially to the U-shape return bend thereof in substantial alignment with the windows 25 and in the photographic field exteriorly of the housing 10 of the camera constituted by the elements described in the case 51. The base plate provides a bore 132 from the side thereof opposite to the housing into the interior of the conduit. A counterbore 133 is also provided in the base plate opposite to the housing.

A substantially cylindrical lamp housing 136 of light transmissible material has an end fitted into the counterbore 133 against an annular gasket 137 and is axially extended from the plate oppositely from the housing 10 and in substantial alignment with the lenses 53 and windows 25. The lamp housing has a bore 138 concentrically of the inner end thereof in communication with the bore 132 through the gasket and a counterbore 139 forming an annular shoulder 140 at its inner end about the bore 138. A circular lamp base 141 is fitted into the counterbore 139 against the shoulder 140. A stroboscopic lamp element 142 is mounted on the base within the bore 138.

A pair of electrical conductors 145 are connected to the lamp element 142 and to the circuit of the power pack. A ground wire 146 is also preferably connected to the element and to the housing 10.

As best shown in Fig. 3, the conductors 145 and ground wire 146 pass through an aperture 149 into the housing 10. Packing 150 is provided in the aperture about the conductors and wire and tightened into a fluid tight seal by a compressing element 151 forced against the packing by a bushing 152 screw-threadably mounted in the aperture.

The extended end of the lamp housing 136 is closed and a rounded or pointed cap 155 of opaque material fitted thereover. A plurality of headed bolts 156 are extended through the base plate 131 and screw-threadably tightened into the cap to draw the cap against the lamp housing and the housing into fluid tight seated engagement against the gasket 137. A substantially clear, electrically non-conductive liquid 157 preferably substantially fills the lamp housing 136 about the stroboscopic element 142, the bore 132 and counterbore of the base plate 131, and the interior of the conduit 130 to aid in resisting crushing and possible leakage when subjected to the frequently excessive pressures encountered in submerged photography.

While the utilization of the stroboscopic lamp element 142, the housing and mounting therefor of the structure described, and the fluid filling of the housing and conduit are significant in themselves, it will be apparent that other forms of light sources and means for mounting the same in the significant relation to the camera can be utilized without departing from the spirit or scope of the basic concept of the present invention.

Operation

The operation of the apparatus of the present invention is believed to be clearly apparent and is briefly summarized at this point. The apparatus is lowered into a well 15 or other operational environment in which photographs are to be made by means of the support cable 32. This may be done by hand, windlass, or any other well known means but one which preferably gives an indication of the depth of the apparatus at all times.

The weight of the housing 10 and elements contained therein is such that it readily submerges in water, oil, and other fluids in which it is normally desired to make photographs. When the housing reaches a depth at which it is desired to photograph, the cable 33 is connected to a source of electrical energy, not shown, remote from the housing 10. Such connection energizes the motor 75 to advance the film 62 a predetermined increment of travel whereupon the motor is automatically deenergized. Concurrently and until the cable 33 is disconnected from the source of electrical energy, the power pack 13 is energized and accumulates a charge of electricity. When the cable 33 is disconnected from the source of electrical energy, the power pack 13 automatically discharges its accumulated charge through the stroboscopic lamp element 14 illuminating the photographic field of the camera exteriorly of the housing. It has been found that the spacing of the light source 14 from the housing 10 in the photographic field of the camera and in substantial alignment therewith, makes possible successful photographing in turbid liquids, liquids containing such extensive quantities of floc or other impurities as to appear substantially opaque, and other liquids in which it was considered impossible to make photographs prior to the present invention. The spacing of the light source from the camera, permits the lights emanating therefrom to diffuse throughout the photographic area for adequate illumination. The shining of the light in such fluids in the direction of aiming of the camera, as practiced in conventional submersible camers, causes light to be reflected from the fluids or impurities therein and precludes successful photography under the difficult conditions described.

In most instances after each exposure of the film 62, the apparatus is either raised or lowered a measured distance so that a sequence of photographs may provide a continuous record of the well or other photographic area. Innumerable photographs in such sequential and repetitive order as desired may be taken without removing the device from the well or other operating region. Although the subject invention is described as particularly advantageous for use below the surface of fluids, it is excellently suited to use in dry holes, fog or steam filled containers, and the like.

It is apparent that the spaced lenses provide stereoscopical pairs of photographs which when viewed through a conventional stereoscope give depth perception to the photographic recording. The effective illumination made possible by the spacing of the light source 14 from the camera, as described, is particularly conducive to effective stereoscopic views. It will be obvious that a single lens may be employed in the device of the present invention instead of the pair of lenses where depth perception in the resultant photographic record is not desired and, of course, either colored or black and white film may be used.

The housing 10 is hermetically sealed and upon employment of a properly insulated cable 33, the apparatus is safely used in oil, gas, gasoline, and other inflammable fluids.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desired to secure by Letters Patent is:

1. An apparatus for illuminating and photographing within boreholes and the like containing light diffusible liquids comprising a substantially fluid tight camera housing have a transparent window therein, a camera mounted within the housing directed through the window and having a photographic field exteriorly of the housing, a tubular arm mounted on the housing and extended therefrom adjacent to the photographic field of the camera, a base plate of light shielding material mounted on the arm in substantial alignment with the camera within the photographic field thereof and in externally spaced relation to the housing, the base plate having a bore therethrough into the tubular arm and a counterbore oppositely disposed from the housing, an annular gasket fitted into the counterbore, a light transmissible housing having a bore therein and an end fitted into the counterbore against the gasket and in registry with the bore in the base plate providing a closed opposite end and being in substantial axial alignment with the direction of the camera through the window, an electric lamp in the bore of the light transmissible housing, electrical conductors connected to the lamp and extended through the base plate and tubular arm into the camera housing for connection to a source of electrical energy, a cap of light shielding material fitted against the light transmissible housing oppositely from the base plate and blocking radiation of light from the lamp away from the housing whereby the base plate and the cap preclude radiation of light from the lamp in alignment with the camera and in parallel relation thereto, and tension bolts interconnecting the cap and the base plate compressing the light transmissible housing in fluid tight engagement with the gasket.

2. In an apparatus for illuminating and photographing objects immersed in liquid containing minute particles of light reflecting material which normally prevent the imaging of objects therein, the combination of camera means adapted for immersion in such a liquid to provide a field of view within the liquid in a predetermined direction in relation to the camera means and externally thereof, a light source adapted for immersion in such a liquid, means mounting the light source on the camera means in predetermined spaced relation thereto in substantial alignment with the predetermined direction of view of said camera means, the light source being adapted to emit light transversely and substantially concentrically of the predetermined direction of view, and means borne by the mounting means adjacent to the light source on opposite sides of said light source in substantial alignment with the camera means and the light source for shielding the particles of light reflecting material from direct light rays from the light source radiated therefrom toward and from the camera means in substantial alignment with the camera means and the light source.

3. An apparatus for illuminating and photographing objects immersed in light diffusible fluids containing particles which reflect light and which ordinarily would prevent the imaging of said objects comprising camera means adapted for immersion in such a liquid to provide a field of view within the liquid in a predetermined direction in relation to the camera means and externally thereof, a light source adapted for immersion in such a liquid, means interconnecting the light source and the camera means in predetermined spaced relation with the light source in substantial alignment with the predetermined direction of view of said camera means, the light source being adapted to emit light transversely and substantially concentrically of the predetermined direction of view, and means borne by the mounting means in substantially rigid association with the light source and camera means adjacent to the light source shielding the camera means for direct light from the light source.

4. An apparatus for photographing objects immersed in light diffusible liquid containing particles which interfere with the obtaining of an image of an immersed object when said liquid is illuminated by light directed toward or from the apparatus comprising a housing, a camera means in the housing having a photographic field exteriorly of the housing in a predetermined direction in relation thereto, a light source mounted on the housing in the photographic field of the camera in spaced relation to the housing adapted to emit light transversely of said predetermined direction, and substantially opaque means mounted on opposite sides of the light source in substantial alignment with the camera means and light source, shielding the particles in the liquid of immersion on the opposite side of the light source from the camera means from direct rays of light from said source radiated away from the camera means in substantial parallelism with said predetermined direction and shielding the camera means and particles between the light source and the camera means from direct rays of light from said source radiated toward the camera means in substantial parallelism with said predetermined direction.

5. An apparatus for illuminating and photographing objects immersed in light diffusible fluids containing particles which reflect light and which ordinarily would prevent the imaging of said objects comprising a housing, a camera means mounted within the housing having a field of view externally of the housing in a predetermined direction in relation to the housing, a source of light mounted on the housing substantially in alignment with said predetermined direction and positioned in spaced relation to the housing and emitting light in said field of view transversely and substantially concentrically of said predetermined direction of the field of view from the housing, said source of light and housing being adapted for immersion in fluids, and means adjacent to the light source shielding the camera means from direct light from the light source.

6. An apparatus for photographing objects immersed in light diffusible fluid containing particles which reflect light and ordinarily obstruct clear view in the fluid comprising a housing adapted for immersion in such fluids, a camera mounted within the housing having a field of view externally of the housing in a predetermined direction in relation to the housing, a source of light adapted for immersion in such fluids mounted on the housing and positioned in spaced relation to the housing in alignment with the predetermined direction of field of view of the camera and substantially concentrically of the field of view of the camera, said light source being adapted to emit light rays therefrom transversely of said predetermined direction of the field of view of the camera, and a light shield mounted between the housing and the light source in spaced relation to the housing and adjacent to the light source shielding the space between the light source and the housing from direct rays of light from the light source in alignment with said predetermined direction.

7. An apparatus for photographing within boreholes and the like having substantially cylindrical walls and containing light diffusible fluid having particles of light reflecting material suspended therein which ordinarily obstruct clear view of objects in the fluid comprising an elongated substantially cylindrical fluid-tight housing adapted for positioning in a borehole in longitudinal position therein, a camera mounted within the housing having a field of view externally of the housing, and substantially axially longitudinally of the housing, a substantially cylindrical light source, means rigidly mounting the light source on the housing in spaced relation to, and substantially coaxially of, the housing within the field of view of the camera adapted to emit light transversely therefrom, and opaque means mounted on opposite axial ends of the light source shielding the light source from the emission of light rays axially of the light source and housing and parallel to the axes of the light source and housing.

8. An apparatus for photographing objects immersed in light diffusible liquid containing particles which prevent the obtaining of a clear image of an immersed object when said liquid is illuminated by light directed toward or from the camera comprising a substantially hermetically sealed housing having a bore therein, camera means within the housing providing a lens in alignment with the bore having a photographic field externally of the housing for photographing a field concentrically of the bore, a light source borne by the housing positioned in substantial alignment with the bore in spaced relation to the housing and within the photographic field of the camera means, said light source having transparent side walls adapted to emit light therefrom transversely of the photographic field to illuminate objects within the photographic field by direct light from the light source and diffused light from the light diffusible liquid, and a light shield disposed transversely of the bore and in spaced relation to the housing adjacent to the light source shielding the lens and particles in the liquid intermediate the light source and the lens from direct light rays from the light source.

9. In a photographic apparatus for illuminating and photographing within boreholes and the like containing light diffusible fluids containing particles which reflect light and which ordinarily prevent imaging of objects therein by light shown in the direction of view or shown in a direction opposite to said view, which apparatus has a substantially fluid tight, pressure resistant camera housing providing a transparent window therein, a shutterless camera mounted within the housing in alignment with the window having a photographic field exteriorly of the housing, said camera having an electrically motivated film driving motor, and an electrical circuit connected to the motor adapted to actuate the motor to advance film through the camera in units of stepped progression; a tubular arm mounted on the housing adjacent to the window and having a closed extended end in the field of view of the camera and in spaced relation to the housing, a light shield mounted on the extended end of the arm having a bore therein in communication with the interior of the tubular arm and a counterbore oppositely disposed from the camera housing, an annular gasket fitted into the counterbore in circumscribing relation to the bore, a substantially cylindrical light housing of transparent material fitted into the counterbore of the base plate and having an axial bore in registry with the bore in the base plate substantially concentrically aligned with the window, the light housing having an end extended from the base plate, a second light shield fitted over the end of the light housing whereby the base plate and the cap preclude emanation of light from the light housing in either direction in alignment with the camera and in parallel to such alignment, means interconnecting the cap and the base plate and compressing the light housing into substantially fluid tight engagement with the gasket, a stroboscopic lamp mounted in the bore of the light housing, electrical conducting means connected to the lamp and extended through the bore of the base plate, the tubular arm and into the camera housing, means in the housing connecting the electrical conducting means to the electrical circuit intermediate successive actuation of the motor to energize the stroboscopic lamp, a packing gland about the electrical conducting means sealing off the tubular arm from the camera housing, and a substantially non-conductive transparent fluid substantially filling the light housing bore, base plate bore, and tubular arm.

References Cited in the file of this patent

UNITED STATES PATENTS

| | | |
|---|---|---|
| 685,463 | Walkins | Oct. 29, 1901 |
| 1,897,111 | Corbett et al. | Feb. 14, 1933 |
| 2,019,059 | Sherman | Oct. 29, 1935 |
| 2,093,128 | Hewitt et al. | Sept. 14, 1937 |
| 2,258,304 | Stanton | Oct. 7, 1941 |
| 2,327,818 | Peterson | Aug. 24, 1943 |
| 2,332,668 | Richards | Oct. 26, 1943 |
| 2,349,932 | Back | May 30, 1944 |
| 2,358,231 | Johnson | Sept. 12, 1944 |
| 2,396,267 | Johnson | Mar. 12, 1946 |
| 2,419,914 | Pamphilon | Apr. 29, 1947 |
| 2,621,569 | Glassey | Dec. 16, 1952 |
| 2,691,918 | Robins et al. | Oct. 19, 1954 |

FOREIGN PATENTS

| | | |
|---|---|---|
| 396,390 | Great Britain | Aug. 1, 1933 |